Figure 1:
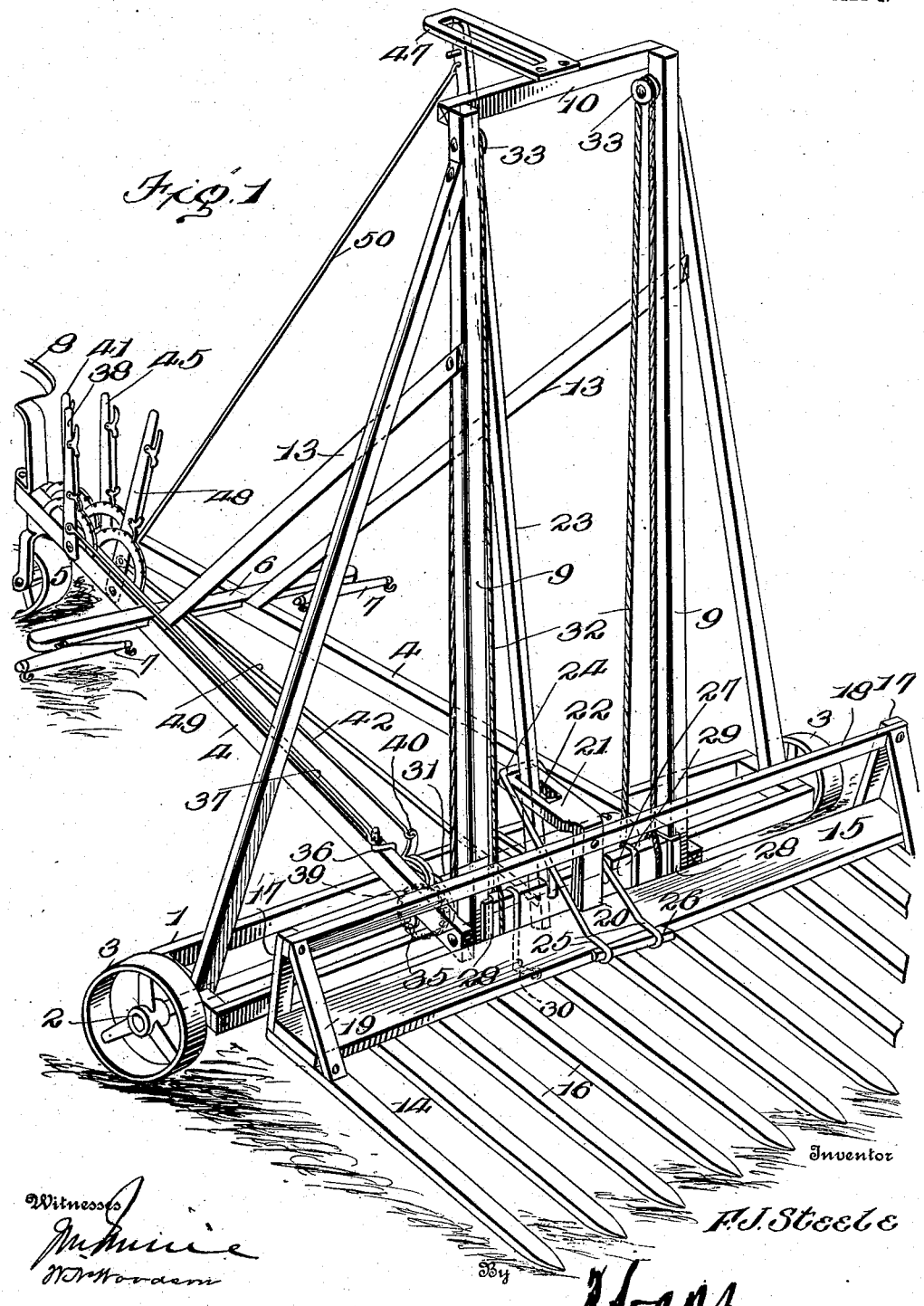

F. J. STEELE.
HAY STACKER.
APPLICATION FILED SEPT. 5, 1908.

916,050.

Patented Mar. 23, 1909.
3 SHEETS—SHEET 1.

Inventor
F. J. Steele

F. J. STEELE.
HAY STACKER.
APPLICATION FILED SEPT. 5, 1908.
916,050.
Patented Mar. 23, 1909.
3 SHEETS—SHEET 2.
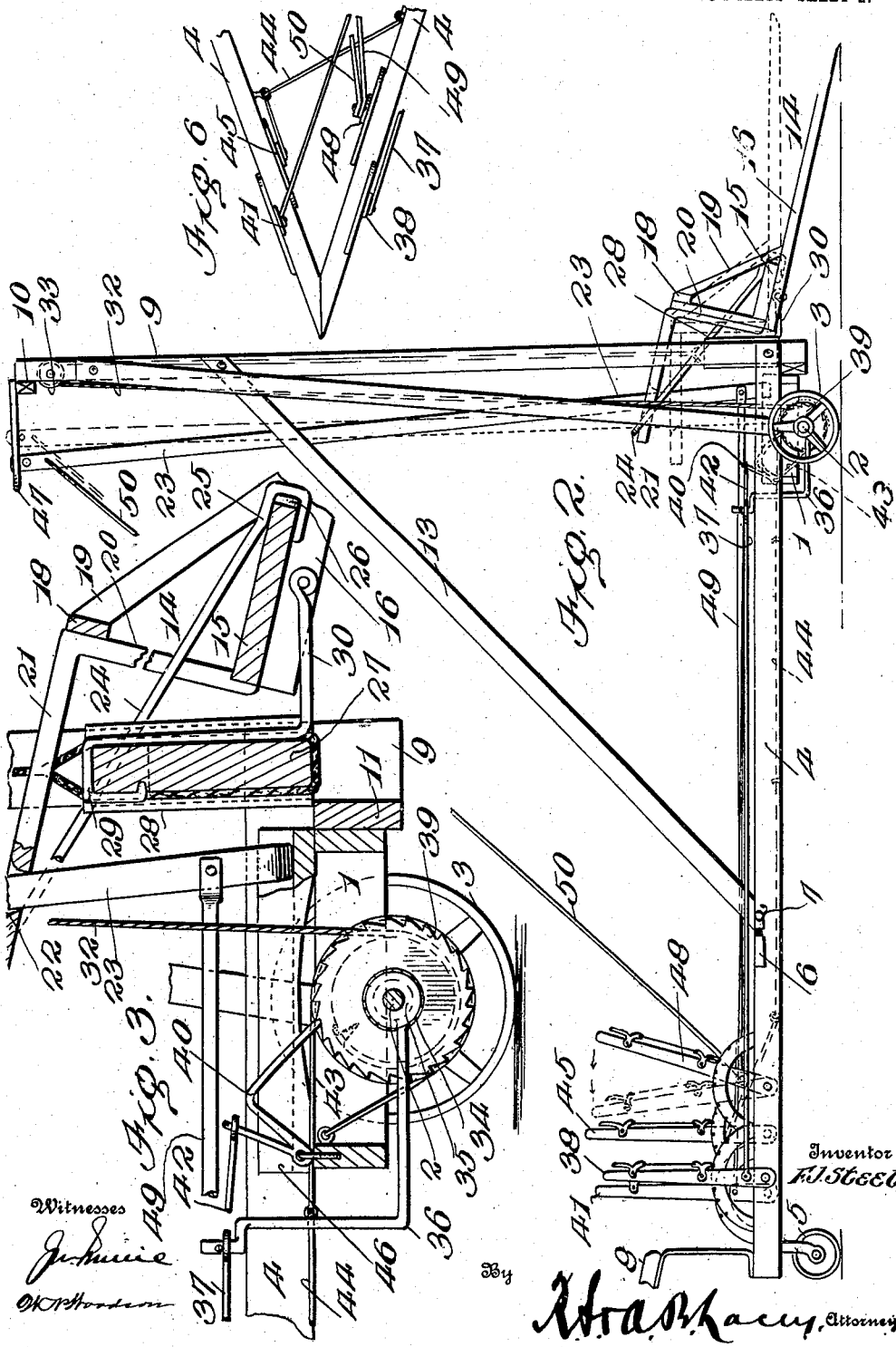
Witnesses
Inventor
F. J. Steele
By
Attorneys

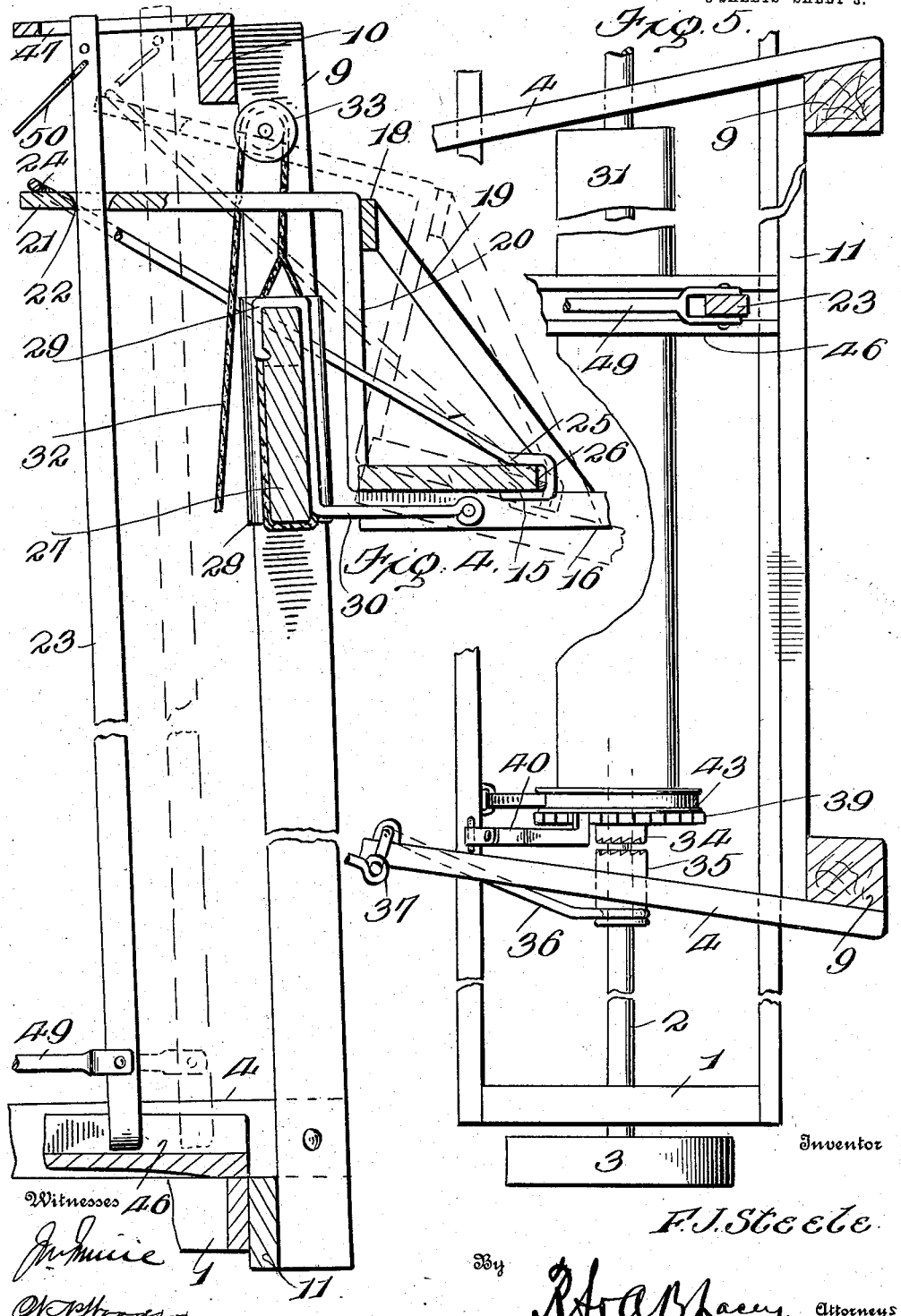

UNITED STATES PATENT OFFICE.

FRANK J. STEELE, OF IMOGENE, IOWA.

HAY-STACKER.

No. 916,050.     Specification of Letters Patent.     Patented March 23, 1909.

Application filed September 5, 1908. Serial No. 451,815.

*To all whom it may concern:*

Be it known that I, FRANK J. STEELE, citizen of the United States, residing at Imogene, in the county of Fremont and State of Iowa, have invented certain new and useful Improvements in Hay-Stackers, of which the following is a specification.

The present invention appertains to machines designed more particularly for stacking hay, straw and the like and which embody a fork and a traveling framework, the latter being movable over the field so as to enable the fork to pick up a shock or bundle of hay or the like and transport the same to and deposit it upon the stack or pile.

The invention aims to provide an improved machine of the character aforesaid which is subservient to the will of the operator and adapted to be easily and conveniently manipulated in all its working parts and which is effective and reliable in operation and positive in results.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of the stacker embodying the invention. Fig. 2 is a side view, the full and dotted lines showing two positions of the fork, the one with the teeth of the fork being horizontal and the other with the fork being tilted to bring the outer ends of the teeth in contact with the ground preliminary to lifting a shock or bunch of hay or the like. Fig. 3 is a vertical section, of the lower forward portion of the machine showing the parts on a larger scale. Fig. 4 is a sectional view of the upright frame, the fork and the fork carrier, showing the upright bar for controlling the movements of the fork, the two positions of the latter being shown by full and dotted lines. Fig. 5 is a plan section of the front portion of the stacker. Fig. 6 is a plan view of the rear portion of the draft frame.

Corresponding and like parts are referred to in the following description and indicated in all the views of the drawings by the same reference characters.

The stacker in its organization embodies a fork and a framework, the latter mounted upon wheels so as to be readily moved over the ground from place to place. The structure is mounted upon a truck and a caster wheel. The truck consists of an oblong frame 1, an axle 2 and ground wheels 3 secured to the ends of the axle 2 so as to turn therewith. A draft frame extends rearwardly from the truck and consists of bars 4 which are secured at their front ends to the truck frame 1 and are converged toward their rear ends and are united in any substantial way and supported upon a caster wheel 5. The draft frame acts in the capacity of a pole or tongue and the team is hitched to the rear end thereof and is arranged so that one horse is located upon each side thereof. A cross bar 6 is attached to the rear end of the draft frame and is provided at its ends with swingletrees 7 to which the animals are hitched in the ordinary way. The driver's seat 8 is located at the rear end of the draft frame.

An upright frame is located in advance of the draft frame and truck and comprises posts 9, an upper cross bar 10 and a lower cross bar 11, said cross bars connecting the respective upper and lower ends of the posts 9. The posts 9 are secured in any substantial way near their lower ends to the front ends of the bars 4, which project a short distance in advance of the truck frame 1. Braces connect the upper portions of the posts 9 with the ends of the truck frame. Other braces 13 extend between the upper portions of the posts 9 and the bars 4, the two sets of braces 12 and 13 serving to stay and fix the position of the upright frame. The upright frame constitutes a guide upon which the fork or load carrier travels, said frame directing the fork in its vertical movements.

The fork or load carrier 14 is of ordinary construction and comprises a head 15 and teeth 16. Posts 17 project upward from the extremities of the head 15 and are connected at their upper ends by means of a cross bar 18, thereby forming a back to the fork to sustain the load and prevent the same passing rearward over the fork. Braces 19 are interposed between the upper ends of the posts 17 and the outermost teeth and serve to stay said posts and the back of the fork. The braces 19 also serve to retain the load and prevent the same passing off the ends of the fork near the back. A bar 20 is located centrally of the head 15 and is attached at its lower end thereto and at its upper end to the cross bar 18. An arm 21 is attached at its front end to the upper end of the bar 20 and extends rearward and is provided with an elongated opening 22 through which an upright bar 23 passes. A brace 24 is interposed between the rear end of the arm 21 and the front edge of the head 15. This brace 24 is of U-form, the lower forward ends of the side members terminating in hooks 25 which embrace the front edge of the head 15. The upper rear end of the brace 24 embraces the rear portion of the arm 21. A key 26 is forced into the space between the front edge of the head 15 and the bights of the hooks 25 so as to tighten the parts and prevent any lost motion.

The fork or load carrier 14 is attached to a carrier and moves therewith, the connection being such as to admit of the fork tilting toward and from the horizontal. The carrier is mounted to travel upon the aforesaid upright frame and comprises a cross head 27 and guides 28 at the ends of the cross head, said guides embracing three sides of the posts 9. The guides 28 may form a part of the cross head or be attached thereto. The fork or load carrier is pivotally connected with the carrier. A series of supports form connecting means between the carrier and fork, each support consisting of a hook 29 and an arm 30. The hooks 29 embrace the upper edge portions of the cross head 27, whereas the arms 30 project forward and come beneath the head 15 of the fork and are pivoted thereto.

The following means are provided for raising and lowering the carrier: A drum 31 is loosely mounted upon the axle 2 and cords or ropes 32 are attached at one end to said drum and extend upward and pass over pulleys 33 near the upper ends of the posts 9, thence extend downward and are connected at their opposite ends to the cross head 27. When the drum 31 is rotated and the cords or ropes 32 are wound thereon, the cross head 27 is elevated, carrying with it the fork. The drum 31 is provided at one end with a clutch member 34. A sleeve or collar 35 is mounted upon the axle 2 to move thereon and to turn therewith and has a clutch member to coöperate with the clutch member 34. When the sleeve or collar 35 is moving to bring the two clutch members into engagement, the drum 31 and axle 2 rotate together, thereby winding the cords or ropes 32 upon the drum and elevating the fork and the load carried thereby. A shipper lever 36 is mounted upon one of the bars 4 of the draft frame and one end is in engagement with the sleeve or collar 35. A rod 37 is connected with the opposite end of the shipper lever and connects the same with a hand lever 38 within convenient reach of the driver's seat, said hand lever being provided with the usual latch and toothed segment coöperating therewith to hold the lever 38 and parts coöperating therewith in the required adjusted position. A ratchet wheel 39 is provided at one end of the drum 31 and a pawl 40 coöperates therewith to hold the drum against backward rotation when it is required to hold the fork and load carrier at any desired elevation. The pawl 40 is adapted to be controlled by means of a lever 41, which latter is located within convenient reach of the driver's seat and is connected in any manner with the pawl, as by means of a wire, rod or cord 42.

For controlling the descent or lowering of the fork, a brake mechanism is provided and arranged to coöperate with the drum 31. As shown, a band 43 encircles an end portion of the drum 31 and is attached at one end to a convenient part of the truck frame 1. A connection 44 is attached at one end to the brake band 43 and extends rearward and is joined to a lever 45 mounted upon the draft frame within convenient reach of the driver's seat. The lever 45 is adapted to be held in any adjusted position by the usual latch and coöperating segment.

The upright bar 23 controls the tilting movements of the fork or load carrier 14 and is stepped at its lower end in a guide 46 and its upper end is mounted in a corresponding guide 47. The guide 46 consists of a bar having a groove or channel in its upper side to receive the lower end of the bar 23. The guide 47 consists of a bar having a slot in which the upper end of the bar 23 is mounted. The bar 23 may be moved to occupy a position parallel with the plane of the posts 9, thereby holding the fork or load carrier in an approximately horizontal position. When the bar 23 is moved so as to incline to the plane of the posts 9, the fork or load carrier tilts, thereby lowering the front ends of the teeth 16 either to permit of the teeth passing beneath the load, as when picking up the same, or admitting of the load discharging readily from the fork after the latter has been elevated and moved to a position over the stack or pile. A lever 48 pivoted to the draft frame within convenient reach of the driver's seat and adapted to be held in an adjusted position by the usual latch and coöperating segment, is connected by means of a rod or bar 49 with the lower end of the bar 23. A second connection 50 is interposed between the lever 48 and the upper end of the bar 23. In one position of the lever 48, the bar 23 is held in a plane parallel with the posts 9, thereby holding the fork approximately level. Upon moving the lever 48, the bar 23 may be inclined to the plane of the posts 9, thereby causing the fork to tilt so as to lower the front ends of the teeth 16 for the purposes herein stated. In practice, a team of horses is hitched to the rear end of the draft frame and is arranged so that one horse walks upon each side of the draft frame. The shock or bunch of hay, straw or the like to be stacked, is received upon the fork. This is effected by advancing the machine to cause the teeth 16 of the fork to pass beneath the load. By operating the lever 48, the fork may be tilted so that the front ends of the teeth 16 may come in contact with the ground. After the fork has been passed beneath the load, the lever 48 is moved to bring the fork into an approximately horizontal position, after which the team is driven so as to move the machine over the field toward the stack. In the travel of the machine toward the stack, the lever 38 is moved to throw the drum 31 into clutched engagement with the axle 2, thereby elevating the load simultaneously with the advance of the same toward the stack, the draft being utilized as the prime power for lifting the load. After the load has been elevated to the required position, the lever 38 is again operated to throw the sleeve or collar 33 out of clutched engagement with the drum, the latter being prevented from turning backward by the combined action of the ratchet wheel 39 and pawl 40. When the machine reaches the stack and is moved to bring the load over the same, the lever 48 is operated to incline the bar 23 and cause the fork to tilt and thereby either discharge the load or facilitate the placing of the same upon the stack. Upon moving the lever 41, the pawl 40 is disengaged from the ratchet wheel 39, thereby permitting the load to descend upon the stack. When the drum 31 is released, the speed of the descent of the fork may be regulated by the brake mechanism through the lever 45 in the manner well understood.

Having thus described the invention, what is claimed as new is:

1. In a machine of the character specified, the combination of a vertically movable load carrier mounted to tilt approximately toward and from the horizontal, means for directing the carrier in its vertical movements, a bar arranged substantially parallel with the plane of movement of said load carrier, connecting means between said load carrier and bar and having a running connection with the latter, and means for moving opposite ends of said bar to incline the same with reference to the plane of travel of the load carrier to effect a tilting of the latter, substantially as and for the purpose specified.

2. In a machine of the character specified, the combination of an upright guide, a load carrier mounted to travel upon said guide and directed in its movements thereby and adapted to tilt approximately toward and from the horizontal, an upright bar having running connection with said load carrier and adapted to effect a tilting of the latter by its relative position, upper and lower guides for said bar, and means for moving opposite ends of said bar to incline the same with reference to the plane of movement of the load carrier to effect a tilting of the latter toward and from the horizontal.

3. In a machine of the character described, the combination of an upright guide, a carrier mounted to travel vertically upon said guide, a fork having pivotal connection with the said carrier to tilt approximately toward and from the horizontal, an upright bar paralleling the aforesaid guide and having running connection with the fork to effect a tilting of the latter toward and from the horizontal, and means for inclining said bar with reference to the aforesaid guide to effect the tilting of the fork.

4. In a machine of the character described, the combination of an upright guide, a carrier mounted to travel thereon, a fork having pivotal connection with said carrier, an arm extended from said fork and having an opening, an upright bar passed through the opening of said arm and adapted to hold the fork in a given position, and means for moving said bar to incline the same with reference to the guide to effect a tilting of the fork, substantially as and for the purpose set forth.

In testimony whereof I affix my signature in presence of two witnesses.

FRANK J. STEELE. [L. S.]

Witnesses:
B. F. BELLWOOD,
J. S. CRISWELL.